(12) United States Patent
van Rensburg

(10) Patent No.: US 10,972,295 B1
(45) Date of Patent: Apr. 6, 2021

(54) SYSTEM AND METHOD FOR DETECTING THE END OF AN ELECTRONIC CONFERENCE SESSION

(71) Applicant: RingCentral, Inc., Belmont, CA (US)

(72) Inventor: Christopher van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/948,778

(22) Filed: Sep. 30, 2020

(51) Int. Cl.
*H04L 12/18* (2006.01)
*H04N 7/14* (2006.01)

(52) U.S. Cl.
CPC ...... *H04L 12/1818* (2013.01); *H04L 12/1822* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 10,192,553 B1* | 1/2019 | Chenier | H04L 65/80 |
| 2014/0247319 A1* | 9/2014 | Anderson | H04N 7/15 |
| | | | 348/14.08 |
| 2015/0302086 A1* | 10/2015 | Roberts | G06F 16/683 |
| | | | 707/771 |
| 2019/0341050 A1* | 11/2019 | Diamant | G06K 9/00288 |

* cited by examiner

*Primary Examiner* — Stella L. Woo

(57) ABSTRACT

A method includes monitoring data associated with an electronic conference session between a plurality of users during the electronic conference session. The method further includes determining that an electronic conference termination event has been triggered based on the monitored data and in absence of a user selection to terminate the electronic conference session. Responsive to determining that the electronic conference termination event has been triggered, an electronic conference session ending event is initiated.

22 Claims, 14 Drawing Sheets

---

Receiving data from an electronic conferencing system
610

↓

Determining that the electronic conference session is about to end or has ended based on the received data absent a user indicating that the electronic conference session is about to end or has ended
620

↓

In response to determining that the electronic conference session is about to end or has ended, triggering an electronic conference session ending event
630

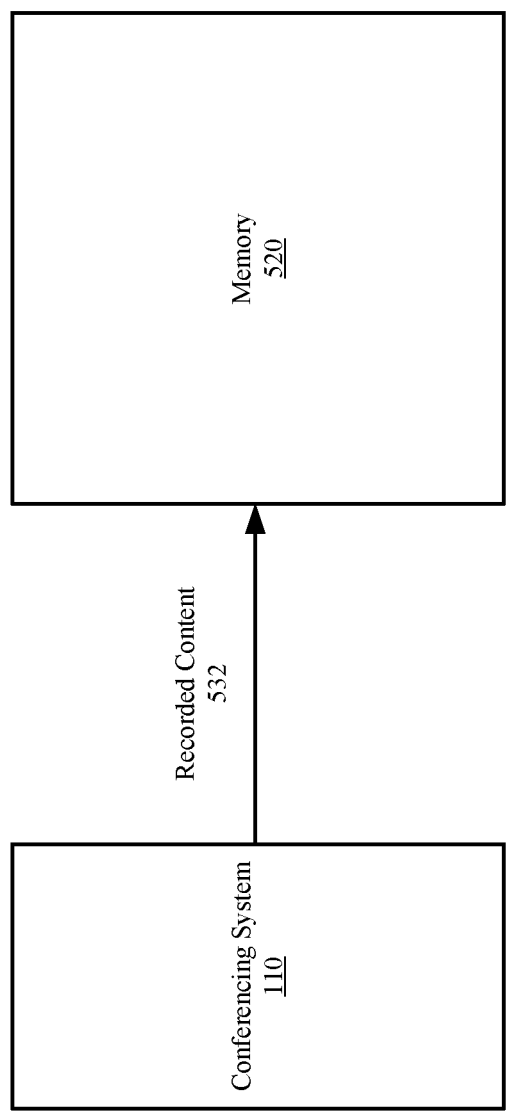

US 10,972,295 B1

SYSTEM AND METHOD FOR DETECTING THE END OF AN ELECTRONIC CONFERENCE SESSION

TECHNICAL FIELD

The present disclosure relates generally to the field of computer supported meeting/conferencing. More specifically, and without limitation, this disclosure relates to systems and methods for automatically detecting whether an electronic conference session has ended or is about to end.

BACKGROUND

Online and virtual meetings have become a prominent feature of conducting business in light of the multi-locational aspect of most businesses. Use and importance of online and virtual meetings have been heightened due to shelter-in-place restrictions that were instituted in response to the COVID-19 pandemic, along with a concomitant trend towards companies allowing more remote working and the resulting migration of many employees to more remote suburbs, or even different cities, states, or countries.

It is not uncommon for a virtual or online meeting, e.g., a videoconference, a webinar session, etc., to effectively conclude without the host explicitly ending the meeting, e.g., by pressing "End Meeting", or before the session's scheduled end time. Accordingly, some participants, e.g., present in the physical venue, may casually speak amongst themselves by being under the impression that the meeting has ended even though the virtual or online meeting is still being broadcast, e.g., audio, video, etc., or even recorded. As such, participants may make off-the-cuff remarks, which may be inappropriate, embarrassing, or even offensive to some. In certain situations, participants may even disclose confidential information unintentionally, which may be broadcast to unintended other participants. Unfortunately, there are currently no safeguards against remarks being made after a virtual meeting has effectively ended but the host has inadvertently left the online meeting on (i.e. the online meeting remains unterminated), thereby broadcasting and/or recording communications among one or more participants after the meeting has effectively ended.

SUMMARY

Accordingly, a smart and intelligent electronic conferencing system is desired to detect whether a virtual/online meeting has ended or is about to end. In some embodiments, the electronic conferencing system determines whether the virtual/online meeting is about to end or has ended without interference by the host, e.g., without the host having to select an "end meeting" control. It is appreciated that in some embodiments, the electronic conferencing system gathers data, e.g., audio data, video data, etc., during the virtual/online meeting and detects whether the virtual/online meeting (also referred to as an electronic conference session) has ended or is about to end. In some embodiments the determination whether the virtual/online meeting has ended or is about to end is by detecting an audio signature, e.g., certain keywords being spoken, applause by participants or an audience, etc., or by detecting audio decibel levels exceeding a certain threshold, or by detecting a change in attendance (i.e. entrance/exit of attendees) in the physical venue exceeding a certain threshold by way of analysis of a video feed (i.e. certain percentage of the virtual/online meeting participants leaving the physical venue), and/or by detecting a certain number of virtual/online meeting participants terminating their respective virtual/online meeting attendance, etc., or by detecting a behavior pattern by way of analysis of a video feed that is consistent with participants preparing to exit a physical venue (e.g. closing their notebook computers, collecting items from a conference table, packing items away in their bags, turning their chairs away from a conference table in preparing to stand, standing up to stretch their legs or gaze out a conference room window, etc.), or by detecting that the scheduled meeting is close to the allotted duration or end time, or by detecting a pattern of multiple concurrent conversations starting between different small groups of participants, or any combination thereof. In some nonlimiting examples, once it is determined that the virtual/online meeting has ended or is about to end, the electronic conferencing system may trigger certain actions to take place. For example, in one nonlimiting example, a graphical user interface (GUI) may render a message to the host or any user of the electronic conferencing system to inquire whether the session has ended and whether the host or the user wishes to terminate the electronic conferencing session, while in other embodiments the electronic conferencing session may automatically be terminated. In some nonlimiting examples, the electronic conferencing system may suspend at least one functionality of the conferencing session, e.g., audio functionality, video functionality, recording functionality, messaging functionality, etc., in response to determining that the virtual/online meeting has ended or is about to end, and such suspension may be permanent or may be lifted contingent upon the system receiving contrary input from the host or other user indicating that the electronic conferencing session has not yet ended.

In some embodiments, a method includes receiving data from an electronic conferencing system. The electronic conferencing system is configured to facilitate an electronic conference session between a plurality of users. The received data is data collected during the electronic conference session. The method further includes determining that the electronic conference session is about to end or has ended based on the received data absent a user indicating that the electronic conference session is about to end or has ended. In response to determining that the electronic conference session is about to end or has ended, an electronic conference session ending event may be triggered. It is appreciated that the electronic conferencing system may be a browser-based conferencing system.

In some embodiments, the electronic conference session ending event suspends at least one functionality, e.g., audio functionality, video functionality, recordation of the electronic conferencing session, etc., of the electronic conference session, either permanently or temporarily. In some embodiments, the electronic conference session ending event renders a message on a GUI to a user of the plurality of users inquiring whether the electronic conference session should be terminated. In some nonlimiting examples, the electronic conference session is terminated in response to the user indicating that the electronic conference session should be terminated.

In some embodiments, the received data includes audio data collected from the plurality of users during the electronic conference session. It is appreciated that in some embodiments the determining includes audio analysis to determine whether an audio signature indicative of the electronic conference session nearing the end or having ended has been detected. In some nonlimiting examples, the audio signature includes a decibel level of the audio data exceeding a threshold level. In some nonlimiting examples, the audio signature includes detecting simultaneous conversation between a subset of the users of the plurality of users. According to some embodiments, the audio signature includes an audio clue indicative of the electronic conference session ending, and the audio clue may include applause by a subset of the users of the plurality of users. It is appreciated that the received data may include video data collected from a subset of users of the plurality of users during the electronic conference session. In some nonlimiting examples, the received data includes video data collected from a subset of users of the plurality of users entering/exiting a conference room or other such venue associated with the electronic conference session.

These and other features and aspects of the concepts described herein may be better understood with reference to the following drawings, description, and appended claims.

BRIEF DESCRIPTION OF DRAWINGS

FIG. 5A is a diagram illustrating an electronic conferencing system generating a recording of an electronic conferencing session and storage thereof according to some embodiments.

DETAILED DESCRIPTION

Figure 1A:
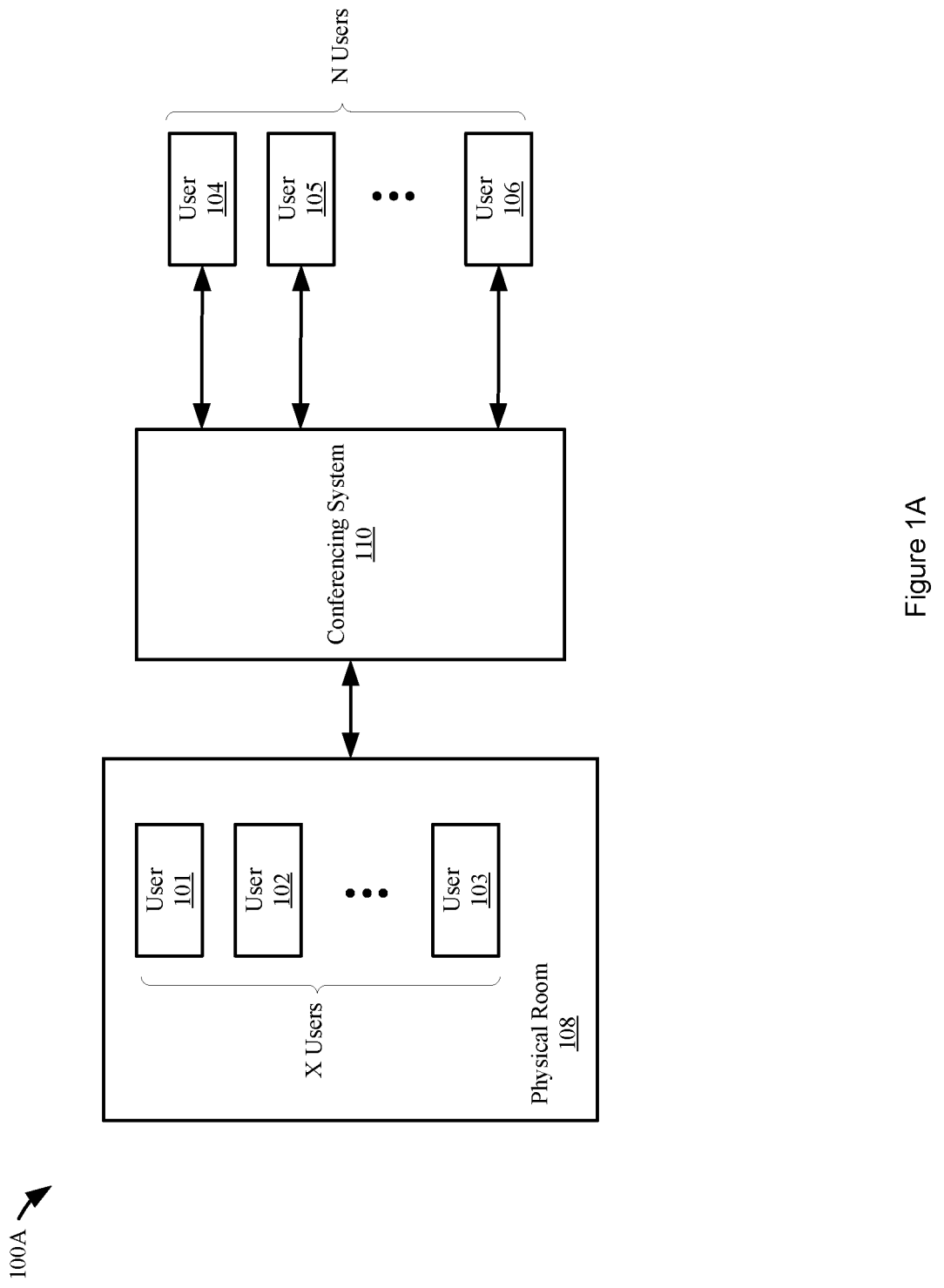
FIG. 1A is a diagram showing an example of online users and users in a physical venue connecting to an electronic conferencing system according to some embodiments.

The example embodiments described herein are directed to an electronic conferencing system. The electronic conferencing system is configured to facilitate communication between users, some of whom may be present in a physical venue (i.e. conference room) and some of whom may attend the meeting virtually and online. It is appreciated that the terms "virtual meeting," "online meeting," and "electronic conference session" may refer to any conferencing, e.g., video conferencing, audio conferencing, webinar, etc. session, and the terms may be used interchangeably throughout the application.

The electronic conferencing system is configured to facilitate data exchanges, e.g., audio data, video data, content data (e.g., PowerPoint®, Word®, PDF, etc.), messaging (e.g., instant messaging), etc., amongst users. It is appreciated that the term "user(s)" generally refers to participants of an electronic conferencing session whether as host or invitee (s). Data communication between the users, e.g., audio, video, content, messaging, etc., during the electronic conferencing session may be monitored by the electronic conferencing system. The electronic conferencing system may analyze the communicated data and determine whether the electronic conferencing session has ended or is about to end. In some embodiments, the determination is made without interference (i.e. an affirmative action) from a user, e.g., without the host terminating the electronic conferencing session by pressing the "End Meeting" button or manually ending the electronic conference session for all participants using other options.

In some nonlimiting examples, the electronic conferencing system determines whether the electronic conferencing session has ended (or effectively ended) or is about to end by detecting an audio signature, e.g., keywords spoken by participants (e.g., "thank you," "the end," "any questions," etc.) or written for example in a PowerPoint® presentation, applause, simultaneous conversation between multiple users, etc. It is appreciated that the terms "session has ended" and "effectively ended" are used interchangeably throughout the application. It is appreciated that in some nonlimiting examples, the audio signature may be an audio level (i.e. in decibels) exceeding a certain threshold, as participants of a meeting often talk to one another after the meeting has ended, resulting in an increase or decrease in audio level. According to some nonlimiting examples, the electronic conferencing system is configured to determine whether the electronic conferencing session has ended or is about to end by detecting a change in attendance (i.e. entrance/exit of attendees) at the physical venue exceeding a certain threshold (i.e. a certain percentage of the physically attending participants of the virtual/online meeting leaving the physical venue) by way of analysis of a video feed (e.g., through facial recognition to count the number of attendees) and/or by detecting a certain number of virtual/online meeting participants terminating their respective attendance of the virtual/online meeting. It is appreciated that the electronic conferencing system may be configured to further determine whether an electronic conferencing session has ended or is about to end using auxiliary data, e.g., allotted time or scheduled end time in a calendar invite, whether the required invitees or a percentage thereof have left the meeting, video feed from the entrance to a physical conference room or equivalent venue (i.e. showing entrance and exit of participants), etc.

The electronic conferencing system is configured to take certain actions once it determines that the electronic conferencing session has ended or is about to end. For example, in one nonlimiting example a message may be rendered on a graphical user interface (GUI) to the host or any user of the electronic conferencing system to inquire whether the session has ended and whether the host or the user wishes to terminate the electronic conferencing session. In other embodiments, the electronic conferencing session may automatically be terminated. In some nonlimiting examples, the electronic conferencing system may suspend at least one functionality of the electronic conferencing session, e.g., audio functionality, video functionality, recording functionality, messaging functionality, etc., in response to determining that the electronic conferencing session has ended or is about to end.

It is appreciated that in some nonlimiting examples, the previously recorded portion (i.e. audio, video, or a combination thereof) of an electronic conferencing session may be modified based on determining that the previously recorded electronic conferencing session includes recording portions that extend beyond the effective end of the electronic conferencing session. In other words, in some nonlimiting embodiments the recorded electronic conferencing session may be clipped such that the portions extending beyond the effective end of the electronic conferencing session are removed and the modified recording is stored. As such, the unnecessary amount of memory storage that was being used is reduced, thereby improving memory usage. Furthermore, in some embodiments the recorded content may be further processed, e.g., high definition analysis, signal processing, etc. As such, identifying the effective end of the electronic conferencing session and clipping the portions of the recorded conferencing session that extend beyond the effective end of the electronic conferencing session results in freeing up processing power that was previously used and wasted on processing portions that extended beyond the effective end of the electronic conferencing session. It is, therefore, appreciated that the embodiments may be applied retroactively to previously recoded conferencing sessions.

It is further appreciated that Machine Learning (ML) and Artificial Intelligence (AI) may be used by the electronic conferencing session to determine whether the electronic conferencing session has ended or is about to end. For example, various clustering or pattern recognition algorithms for ML can be used to identify whether the electronic conferencing session has ended or is about to end. It is appreciated that the ML algorithm may be supervised or unsupervised. For example, training data associated with electronic conferencing sessions terminating or about to terminate may be fed into the ML algorithm. As such, a pattern may emerge such that when the ML algorithm is applied to data from other electronic conferencing sessions, it can be determined whether the electronic conferencing session has ended or is about to end. In some nonlimiting examples, unsupervised training data may be fed into the ML algorithm and a pattern associated with an electronic conferencing session ending or being about to end may emerge over time.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "rendering," "utilizing," "launching," "calling," "starting," "accessing," "sending," "conferencing," "triggering," "ending," "suspending," "terminating," "clipping," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1A is a diagram showing an example of online users and users in a physical venue connecting to an electronic conferencing system according to some embodiments. The system 100A includes a plurality of users (X number of users), e.g., users 101, 102, ..., 103, in a physical venue such as a physical room 108, a plurality of online users (N number of users), e.g., users 104, 105, ..., and 106, that are connected to an electronic conferencing system 110. The electronic conferencing system 110 is configured to facilitate data exchanges, e.g., audio data, video data, content data (e.g., PowerPoint®, Word®, pdf, etc.), messaging (e.g., instant messaging), etc., between the users. In other words, the electronic conferencing system 110 is configured to facilitate a video conference, an audio conference, webinar, etc. It is appreciated that the electronic conferencing system 110 and/or electronic devices of one or more users may be application based or web-browser based.

The electronic conferencing system 110 may be used to schedule electronic conferencing sessions between the users. A subset of the users may be physically present and a subset may join virtually online. It is appreciated that some of the users may be "required" and some may be "optional" for the scheduled meeting. The electronic conferencing system 110 is configured to schedule the electronic conferencing session and to facilitate data communication between the users, e.g., audio, video, content, messaging, etc., during the electronic conferencing session. In some embodiments, the electronic conferencing system 110 is configured to monitor the communication exchanges between the users during the electronic conferencing session. In some embodiments, the electronic conferencing system 110 may receive the data being communicated between the users. The electronic conferencing system 110 may analyze the communicated data and determine whether the electronic conferencing session has ended or is about to end. In some embodiments, the determination is made without interference from a user ending the electronic conferencing session, e.g., without the host terminating the electronic conferencing session by pressing "end meeting."

In some nonlimiting examples, the electronic conferencing system 110 determines whether the electronic conferencing session has ended (or effectively ended) or is about to end by detecting an audio signature, e.g., spoken keywords (e.g., "thank you," "the end," "any questions," "to recap," etc.) or written, for example, in a PowerPoint® presentation, applause, simultaneous conversation between multiple users, etc. It is appreciated that the audio signature used to determine whether the electronic conferencing session has ended or is about to end may be detected through use of neural linguistic programming (NLP). It is appreciated that the audio signature may be any audio consistent with a pattern of meeting participants leaving, e.g., audio of laptops closing, sound of chairs moving, simultaneous conversation among a number of users, applause, audio of items being picked up by attendees, audio of papers shuffling, etc. It is appreciated that in some nonlimiting examples, the audio signature may be an audio level (i.e. in decibels) exceeding a certain threshold (e.g., increase in audio level by a certain percentage, such as 20%, 25%, 30%, etc.) because participants of meetings often talk to one another after the meeting ends, resulting in an increase or decrease in audio level.

According to some nonlimiting examples, the electronic conferencing system 110 is configured to determine whether the electronic conferencing session has ended or is about to end using auxiliary data (also referred to as supplemental data). For example, the electronic conferencing system 110 may determine that an electronic conferencing session has ended or is about to end by detecting a change in the number of attendees. As a nonlimiting example, it may be determined that an electronic conferencing session has ended or is about to end if the number of attendees drops by a certain predetermined threshold, e.g., 20%, 25%, etc. It is appreciated that the number of attendees may be tracked online (i.e. attendees "leave meeting" and the number decreases). It is appreciated that the number of attendees may be tracked physically using a camera. For example, a camera facing the entrance to the physical room 108 can be used to detect a change in the number of attendees whereas in other nonlimiting examples a camera facing the conference table or the room can be used to detect a change in the number of attendees (i.e. entrance/exit of attendees). In some nonlimiting examples, it may be determined that a meeting has ended or is about to end if a number of attendees decreases by a certain threshold amount. It is further appreciated that the timing of the scheduled electronic conferencing session may also be used in combination with the number of attendees leaving, such that more weight is given to the number of attendees leaving, indicative of the meeting ending if that occurs closer in time proximity to the end of the scheduled electronic conferencing session, whereas less weight is given if that occurs closer in time to the start of the scheduled electronic conferencing session. For example, in some nonlimiting examples the same cues indicative of the fact the meeting has ended may be weighted differently, e.g., weighted higher such as 0.9, when they occur closer in time proximity to the end of the scheduled electronic conferencing session whereas the same cues are weighted lower, e.g., such as 0.1, when they occur closer in time to the start of the scheduled electronic conferencing session.

The electronic conferencing system 110 is configured to take certain actions once it determines that the electronic conferencing session has ended or is about to end. For example, in one nonlimiting example, a message may be rendered on a GUI to the host or any user of the electronic conferencing system to inquire whether the session has ended and whether the host or the user wishes to terminate the electronic conferencing session. If a user, such as a host, indicates that the electronic conferencing session has ended by responding to the message being rendered, then the electronic conferencing system 110 may end the electronic conferencing session or place it in a suspending mode (described in more detail below). It is appreciated that in some nonlimiting embodiments, the electronic conferencing system 110 may automatically terminate the electronic conferencing session if it determines that the electronic conferencing session has ended or is about to end. According to some nonlimiting examples, the electronic conferencing system 110 may suspend at least one functionality of the electronic conferencing session, either in response to a user such as a host indicating that the electronic conferencing session has ended (as described above) or in response to determining that the electronic conferencing session has ended or is about to end. According to some nonlimiting examples, the suspension of one or more functionalities of the electronic conferencing session may involve suspension of an audio functionality (e.g., muting audio), a video functionality, a recording functionality, a messaging functionality, a speech translation functionality, a spectral analysis of the audio, processing for the enhancement of video, etc. It is appreciated that the suspension may be a temporary suspension, e.g., for 1 minute, for 2 minutes, for 5 minutes, etc., after which the electronic conferencing system 110 may terminate the electronic conferencing session if there is no user intervention. In some nonlimiting examples, the suspension of one or more functionalities may be restored back to their operational mode in response to a user, e.g., a host, indicating that the electronic conferencing session has not ended.

Accordingly, the electronic conferencing system 110 provides safeguards against inadvertent sharing of off-the-cuff remarks, which may be inappropriate, embarrassing, or even offensive to some, that may often occur after an electronic conferencing session has effectively ended. It is further appreciated that the electronic conferencing system 110 provides safeguards against inadvertent disclosure of confidential information to unintended participants. Moreover, since the electronic conferencing system 110 may store the electronic conferencing session, terminating the electronic conferencing session at the end of the meeting not only safeguards against some of the embarrassing situations described above, but it also achieves a more efficient use of memory storage (i.e. portions of the electronic conferencing session extending beyond the end of the meeting are not captured). Furthermore, a more efficient use of processing (i.e. CPU) is made because no processing, e.g., speech translation, processing for the enhancement of video, etc., is performed on the portions of the electronic conferencing session extending beyond the end of the meeting.

Figure 1B:
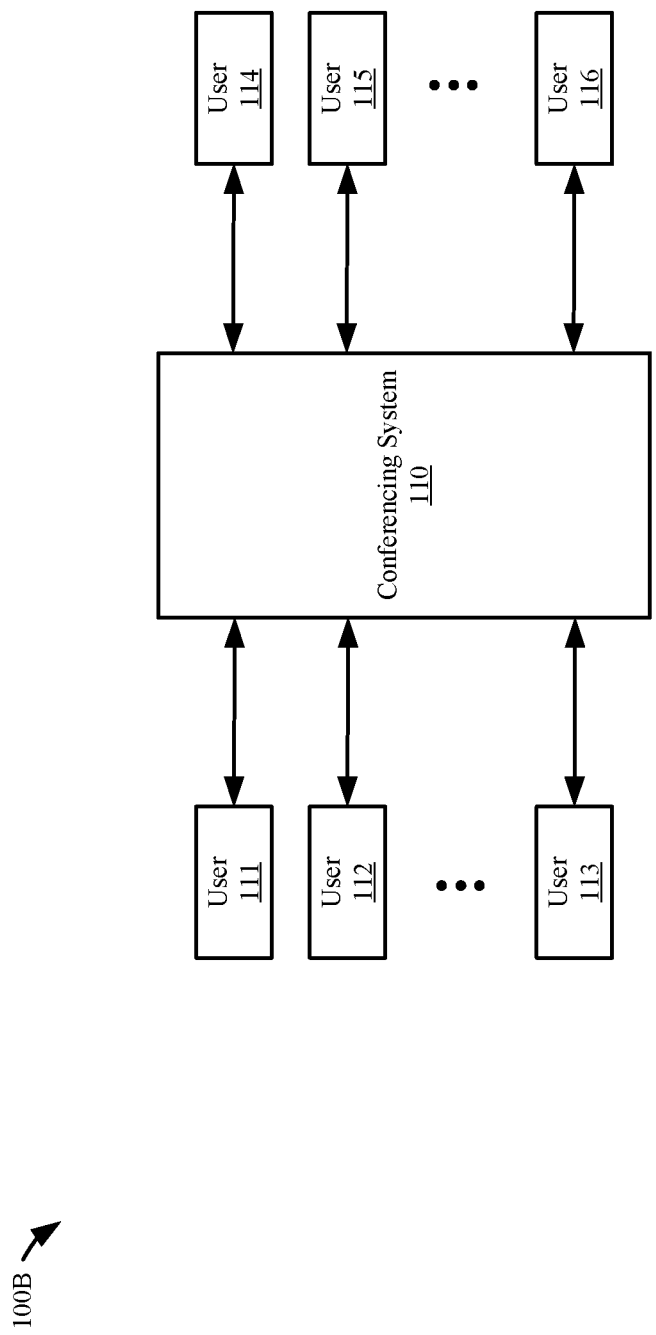
FIG. 1B is a diagram showing an example of online users connecting to an electronic conferencing system according to some embodiments.

FIG. 1B is a diagram showing an example of online users connecting to an electronic conferencing system according to some embodiments. The system 100B of FIG. 1B is substantially similar to that of FIG. 1A except that in this embodiment, users 111, 112, . . . , 113, 114, 115, . . . , 116 are connected to the electronic conferencing system 110 virtually without physical presence (i.e. no physical venue). It is appreciated that one or more criteria of FIG. 1A may be excluded, in FIG. 1B, in determining whether the electronic conferencing session has ended or is about to end.

Figure 2A:
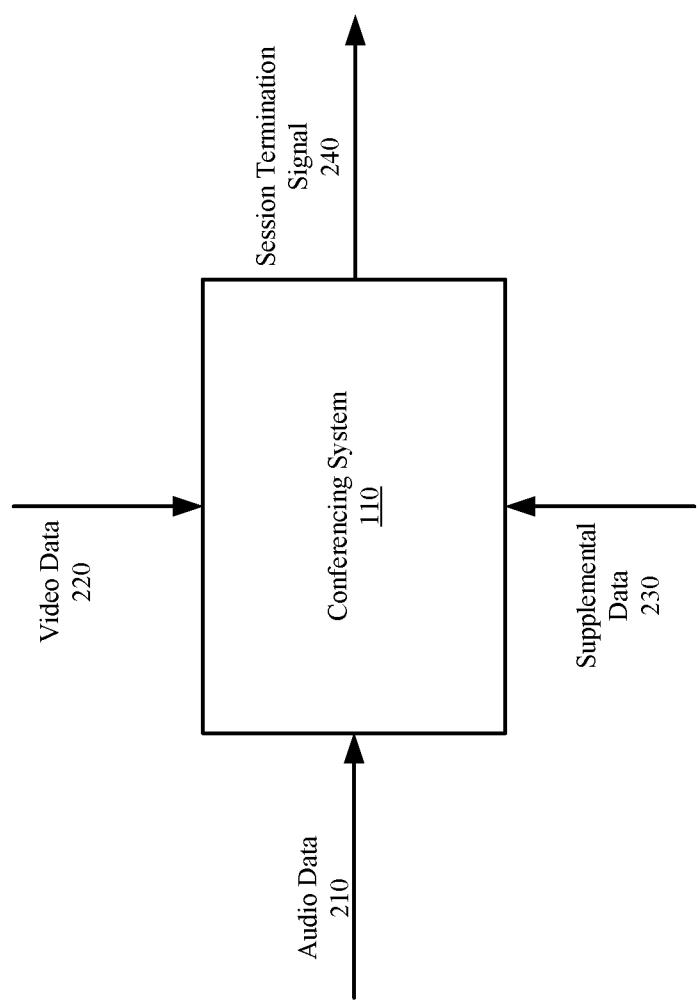
FIG. 2A is a diagram illustrating the electronic conferencing system determining whether an electronic conferencing session has ended or is about to end according to some embodiments.

FIG. 2A is a diagram illustrating the electronic conferencing system determining whether an electronic conferencing session has ended or is about to end according to some embodiments. The electronic conferencing system 110 may receive different data types. For example, the electronic conferencing system 110 may receive audio data 210, video data 220, supplemental data 230, or any combination thereof.

The audio data 210 may be audio data collected during the electronic conferencing session, e.g., audio of a user presenting, participants asking questions, etc. It is appreciated that the audio data 210 may also include background audio, e.g., the sound of laptops closing, the sounds of papers shuffling, the sound of chairs moving, the sound of items being picked up by attendees, applause, simultaneous conversation between multiple users, etc.

The video data 220 may include video of users joining the electronic conferencing session, e.g., video stream of users joining the electronic conferencing session through a video stream of their electronic device like their laptop, a video stream of users joining the electronic conferencing session obtained by way of a video feed captured from a physical venue such as a conference room, video stream of user(s) displaying and illustrating a product, etc.

The supplemental data 230 (also referred to as auxiliary data) is data associated with the electronic conferencing session. For example, the supplemental data 230 may include the time, date, and duration of the electronic conferencing session. In some nonlimiting examples, the supplemental data 230 may include identification of users that are designated as "required" as opposed to users that are designated as "optional" for the electronic conferencing session. According to some nonlimiting examples, the supplemental data 230 may include the content being shared, e.g., PowerPoint® presentation, a Word® document being shared, etc. In some embodiments, the supplemental data 230 may include any texts or instant messages being exchanged during the electronic conferencing session. In some nonlimiting examples, the supplemental data 230 may include a video stream of individuals entering/exiting a physical venue (i.e. conference room) during the electronic conferencing session. In some embodiments, the supplemental data 230 may include data captured from one or more users manipulating their respective devices, e.g., pressing a button or running an application.

It is appreciated that the electronic conferencing system 110 may use the audio data 210, video data 220, supplemental data 230, or any combination thereof to determine whether the electronic conferencing session has ended or is about to end. The electronic conferencing system 110 may generate a session termination signal 240 in response to determining that the electronic conferencing session has ended or is about to end. In some embodiments, the session termination signal 240 may be generated regardless of the determination but its value may be different. For example, a session termination signal 240 with a 1 value may indicate that the electronic conferencing session has ended or is about to end, whereas a 0 value may indicate that the electronic conferencing session is still ongoing. In some embodiments, the electronic conferencing system 110 may further calculate a confidence score, being the confidence that the system has in its determination of whether the electronic conferencing session has ended or is about to end, which confidence score may be a represented by a percentage or a fractional number ranging from 0 to 1, and which confidence score may be transmitted along with or as part of session termination signal 240. In yet other embodiments, the value of such a confidence score may be used as the value for the session termination signal 240, such that a session termination signal 240 with a 1 value may indicate that the electronic conferencing system 110 has determined with 100% confidence that the electronic conferencing session has ended or is about to end, whereas a session termination signal 240 with a 0.75 value may indicate that the electronic conferencing system 110 has determined with 75% confidence that the electronic conferencing session has ended or is about to end, and a session termination signal 240 with a 0 value may indicate that the electronic conferencing system 110 has determined with 0% confidence that the electronic conferencing session has ended or is about to end (i.e. the electronic conferencing session is still ongoing).

In some nonlimiting examples, the electronic conferencing system 110 determines whether the electronic conferencing session has ended (or effectively ended) or is about to end by detecting an audio signature, e.g., certain spoken or written keywords (e.g., "thank you," "the end," "any questions," "to recap," "in conclusion," etc.), applause, simultaneous conversation between multiple users, the sound of shuffling of paper, the sound of chairs moving, the sound of doors opening/closing, the sound level exceeding a certain threshold (i.e. decibels), etc. As discussed above, NLP may be used to determine the electronic conferencing session has ended or is about to end. In other words, the audio signature may be any audio consistent with a pattern of meeting participants leaving and is not limited to the examples provided above.

In some nonlimiting examples, the electronic conferencing system 110 determines whether the electronic conferencing session has ended (or effectively ended) or is about to end by analyzing the video data 220. For example, analyzing the video data 220 may reveal that a number of the users (i.e. participants) in the physical venue stood up and left the conference room, thereby concluding that the electronic conferencing session has ended or is about to end. It is appreciated that the determination of whether the electronic conferencing session has ended or is about to end may be made if the number of users leaving the meeting has exceeded a certain threshold or if the net change in the number of users leaving the meeting has exceeded a certain threshold. In some nonlimiting examples, the video data 220 may be from virtual users standing up and leaving. According to some embodiments, the video data 220 may be of user(s) demonstrating a product followed by applause or a question/answer session which may in turn, indicate whether the electronic conferencing session has ended or is about to end.

In some embodiments, the electronic conferencing system 110 determines whether the electronic conferencing session has ended (or effectively ended) or is about to end by analyzing the supplemental data 230. For example, analyzing the supplemental data 230 may reveal the number of "required" users that have left the electronic conferencing session has exceeded a certain threshold, e.g., 20%, 25%, etc., indicative of the fact that the electronic conferencing session has ended or is about to end. According to some embodiments, analyzing the supplemental data 230 may reveal that the number of users that have left, regardless of whether they are "required" or are "optional," has exceeded a certain threshold, thereby indicative of the fact that the electronic conferencing session has ended or is about to end. In some nonlimiting examples, a host leaving the meeting may be a strong indication that the meeting has ended and/or a large number of "required" users leaving may be a strong indication that the meeting has ended whereas a large number of "optional" users leaving may be a weak indication that the meeting has ended. In some nonlimiting examples, analyzing the content being presented, e.g., slides, reveals that the content is close to the end, thereby indicating that the electronic conferencing session is about to end or has ended. Certain clues in the content may reveal that the conferencing session has ended or is near its end, e.g., "Q/A", "conclusion," "Thank You," etc. It is appreciated that in some nonlimiting examples, instant messages between users may reveal that the electronic conferencing session is about to end or has ended. In some nonlimiting examples, the time/date and duration of the electronic conferencing session may be used to determine whether the electronic conferencing session has ended or is near its end. It is appreciated that in some embodiments, the time/date and duration may be used to provide weight to the determination of whether the electronic conferencing session has ended or is about to end. For example, determining that the electronic conferencing session has ended or is about to end may be given very little weight if the determination is made relatively at the beginning of the electronic conferencing session (as scheduled) whereas a much higher weight is given if it occurs toward the scheduled end of the electronic conferencing session.

It is appreciated that the determination made by the electronic conferencing system 110 that the electronic conferencing session has ended or is about to end may be weighted and scored. As such, a higher score may indicate a higher confidence that the electronic conferencing session has ended whereas a lower score may indicate a lower confidence that the electronic conferencing session has ended or is about to end. In some nonlimiting examples, the session termination signal 240 may be generated based on the confidence score. In some nonlimiting examples, the confidence score may be determined based on a weighted equation where parameters of the weighted equation are various cues indicative of whether the meeting has ended or is about to end, and where the weights are reflective the importance of the cue to determine whether the meeting has ended or is about to end.

The electronic conferencing system 110 is configured to take certain actions once it determines that the electronic conferencing session has ended or is about to end (i.e. in response to generation of the session termination signal 240). In some embodiments, a message may be rendered on a GUI for one or more users, e.g., a host, inquiring whether the electronic conferencing session has ended and whether the host or the user wishes to terminate the electronic conferencing session. If a user, such as a host, indicates that the electronic conferencing session has ended by responding to the message being rendered, then the electronic conferencing system 110 may end the electronic conferencing session or place it in a suspending mode as described above. It is appreciated that in some nonlimiting embodiments, the electronic conferencing system 110 may automatically terminate the electronic conferencing session if it determines that the electronic conferencing session has ended or is about to end. According to some nonlimiting examples, the electronic conferencing system 110 may suspend at least one functionality of the electronic conferencing session, either in response to a user, such as a host, indicating that the electronic conferencing session has ended (as described above), or in response to determining that the electronic conferencing session has ended or is about to end. According to some nonlimiting examples, the suspension of one or more functionalities of the electronic conferencing session may involve suspension of an audio functionality (e.g., muting audio), a video functionality, a recording functionality, a messaging functionality, a speech translation functionality, a spectral analysis of the audio, processing for the enhancement of video, etc. It is appreciated that the suspension may be a temporary suspension, e.g., for 1 minute, for 2 minutes, for 5 minutes, etc., after which the electronic conferencing system 110 may terminate the electronic conferencing session if there are no user interventions. In some nonlimiting examples, the suspension of one or more functionalities may be restored back to their operational mode in response to a user, e.g., a host, indicating that the electronic conferencing session has not ended.

It is appreciated that the examples of determining whether an electronic conferencing session has ended or is about to end using audio data, video data, supplemental data, or any combination thereof is for illustrative purposes only and should not be construed as limiting the scope of the embodiments.

Figure 2B:
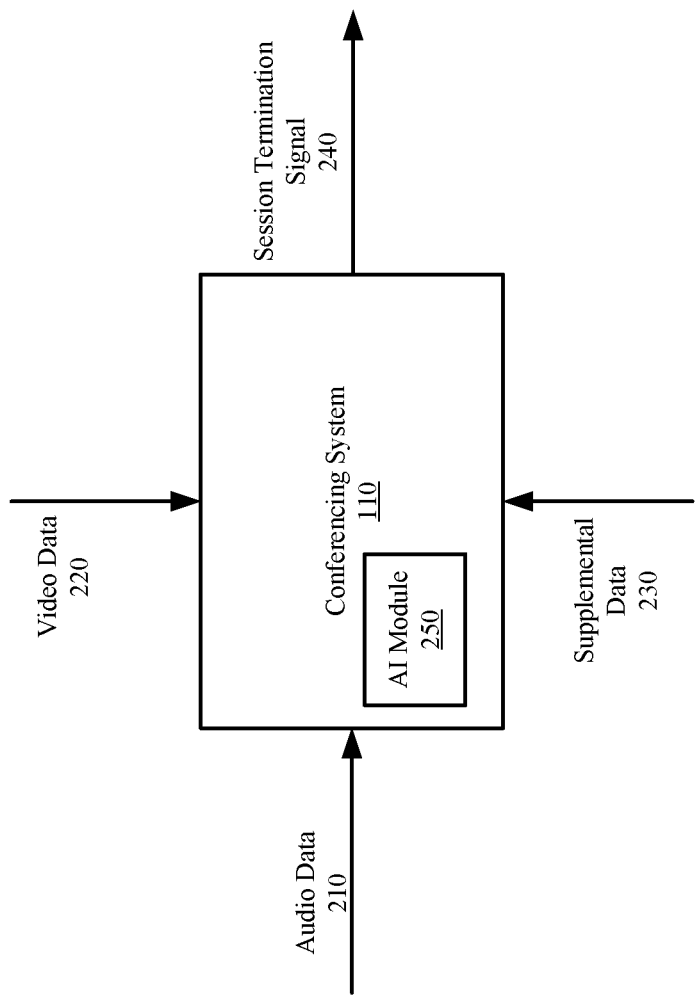
FIG. 2B is a diagram illustrating the electronic conferencing system leveraging an Artificial Intelligence (AI) module in determining whether an electronic conferencing session has ended or is about to end according to some embodiments.

FIG. 2B is a diagram illustrating the electronic conferencing system leveraging an Artificial Intelligence (AI) module in determining whether an electronic conferencing session has ended or is about to end according to some embodiments. FIG. 2B is substantially similar to that of FIG. 2A. In FIG. 2B, AI module 250 is utilized to make a determination whether the electronic conferencing session has ended or is about to end. For example, the AI module 250 may be an ML algorithm used to cluster and identify a pattern, e.g., pattern consistent with meeting ending as described above. In other words, the ML algorithm may identify whether the current electronic conferencing session belongs to a cluster (a cluster of similar electronic conferencing sessions that have been previously identified as having one or more characteristics consistent with an electronic conferencing session having ended or being near the end). It is appreciated that the ML algorithm may be a supervised or unsupervised, as described above.

Figure 3A:
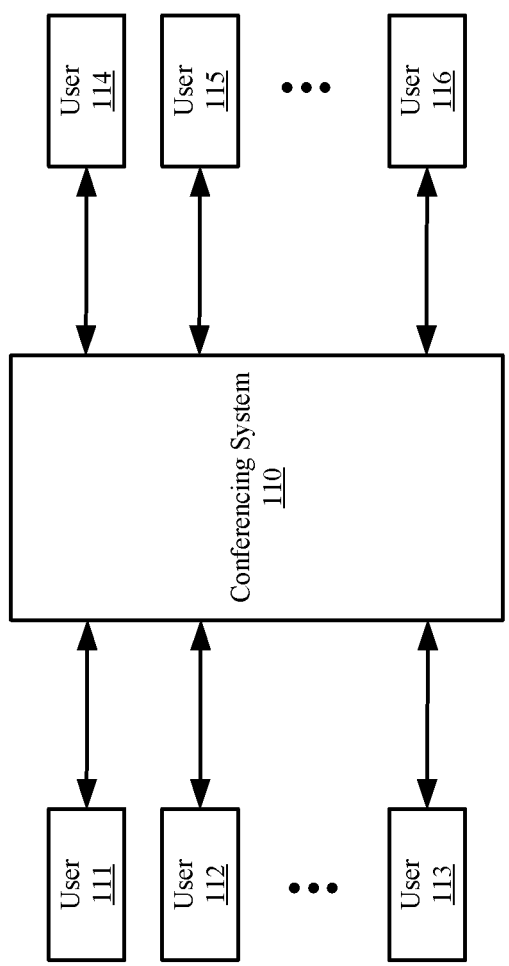
FIG. 3A is a diagram illustrating an electronic conferencing session initiated and users joining the electronic conference session according to some embodiments.

FIG. 3A is a diagram illustrating an electronic conferencing session initiated and users joining the electronic conference session according to some embodiments. FIG. 3A is substantially similar to FIGS. 1A and 1B without necessarily distinguishing between users that are physically present at a physical venue and/or are virtually attending the electronic conferencing session.

Figure 3B:
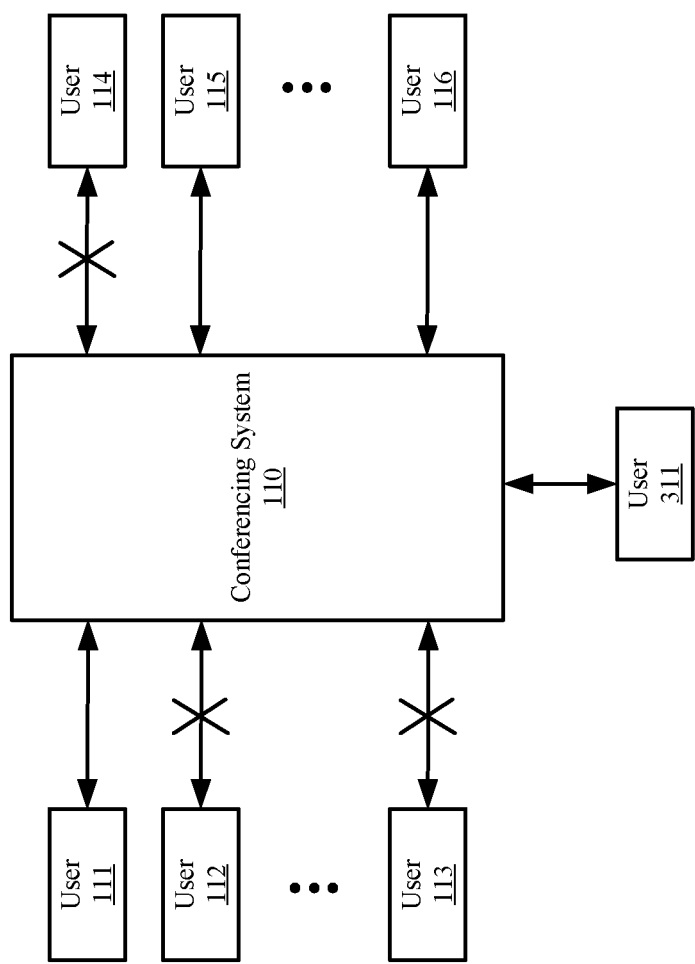
FIG. 3B is a diagram illustrating users joining and leaving the electronic conferencing session throughout the electronic conferencing session according to some embodiments.

FIG. 3B is a diagram illustrating users joining and leaving the electronic conferencing session throughout the electronic conferencing session according to some embodiments. In this figure, users 112, 113, and 114 have left the electronic conferencing session while user 311 has joined the electronic conferencing session and users 111, 115 and 116 remain in the electronic conferencing session.

Figure 3C:
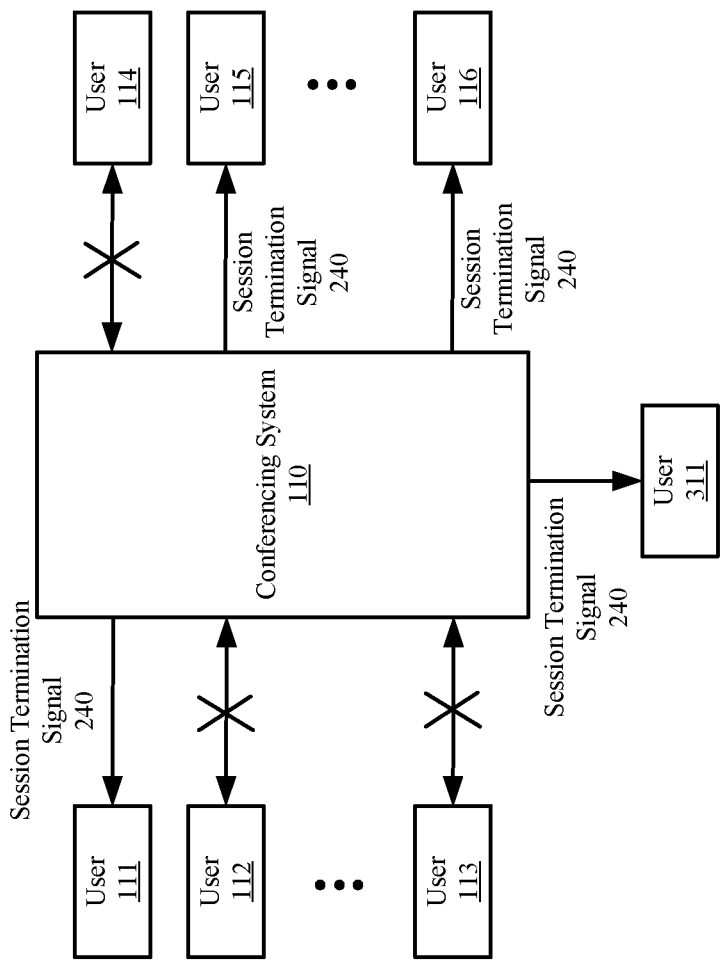
FIG. 3C is a diagram illustrating the electronic conferencing system determining that the electronic conferencing session has ended or is about to end according to some embodiments.

FIG. 3C is a diagram illustrating the electronic conferencing system determining that the electronic conferencing session has ended or is about to end according to some embodiments. In this embodiment, the electronic conferencing system 110 determines that the electronic conferencing session has ended or is about to end based on the audio data 210, video data 220, supplemental data 230, or any combination thereof, as described above. Accordingly, the electronic conferencing system 110 generates the session termination signal 240 to the users that are still present, e.g., users 111, 115, 116, . . . , and 311.

Figure 3D:
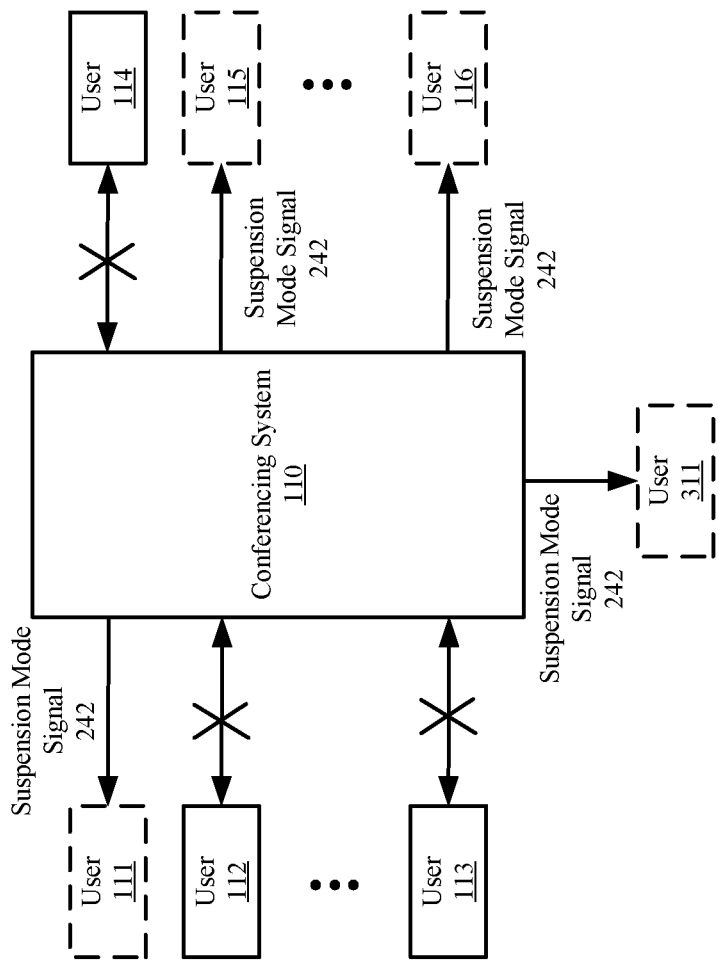
FIG. 3D is a diagram illustrating the electronic conferencing system suspending certain functionalities of the electronic conferencing session in response to determining that the electronic conferencing session has ended or is about to end according to some embodiments.

FIG. 3D is a diagram illustrating the electronic conferencing system suspending certain functionalities of the electronic conferencing session in response to determining that the electronic conferencing session has ended or is about to end, according to some embodiments. In some nonlimiting examples, in response to the electronic conferencing system 110 determining that the electronic conferencing session has ended or is about to end, a suspension mode signal 242 is generated in order to suspend one or more functionalities (as described above) of the electronic conferencing session. It is appreciated that the suspension of one or more functionalities of the electronic conferencing session for users 111, 115, 116, . . . , 311 is illustrated as by the dashed lines of the users 111, 115, 116, . . . , 311. As described above, suspension of one or more functionalities may be temporary and in absence of a user, e.g., a host, indicating otherwise, it may become permanent after a certain period of time, e.g., 1 minute, 2 minutes, 5 minutes, etc. It is appreciated that the one or more functionalities that are suspended may be restored in response to a user, e.g., a host, indicating that the electronic conferencing session has not ended.

Figure 3E:
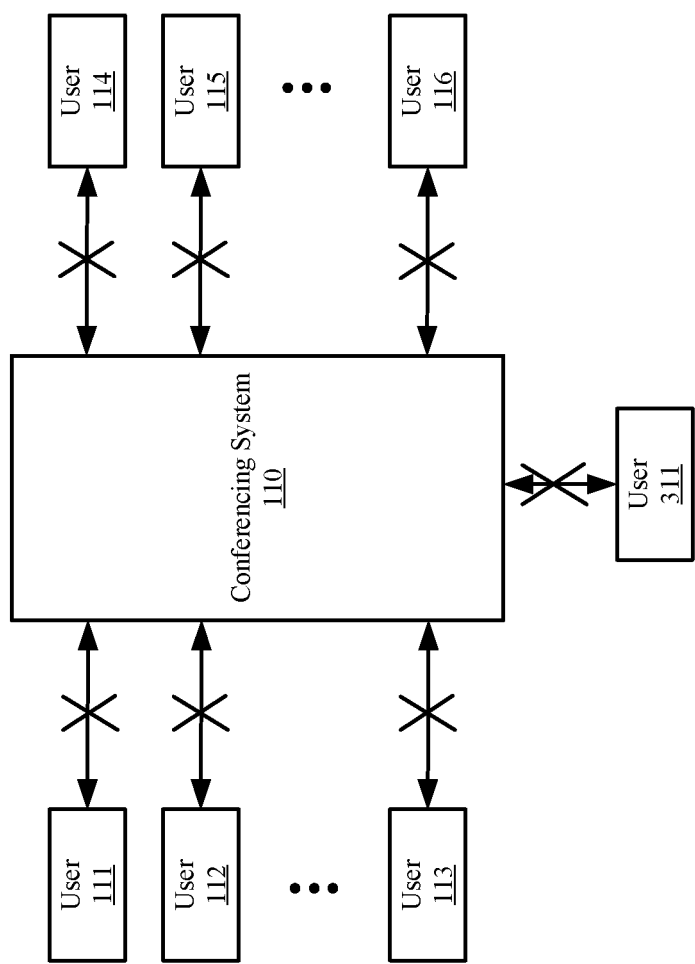
FIG. 3E is a diagram illustrating the electronic conferencing system automatically terminating the electronic conferencing session in response to determining that the electronic conferencing session has ended or is about to end according to some embodiments.

FIG. 3E is a diagram illustrating the electronic conferencing system automatically terminating the electronic conferencing session in response to determining that the electronic conferencing session has ended or is about to end, according to some embodiments. In this embodiment, the electronic conferencing system 110 automatically terminates the electronic conferencing session for all users in response to determining that the electronic conferencing session has ended (or effectively ended) or is about to end, as described in FIG. 3C.

Figure 4:
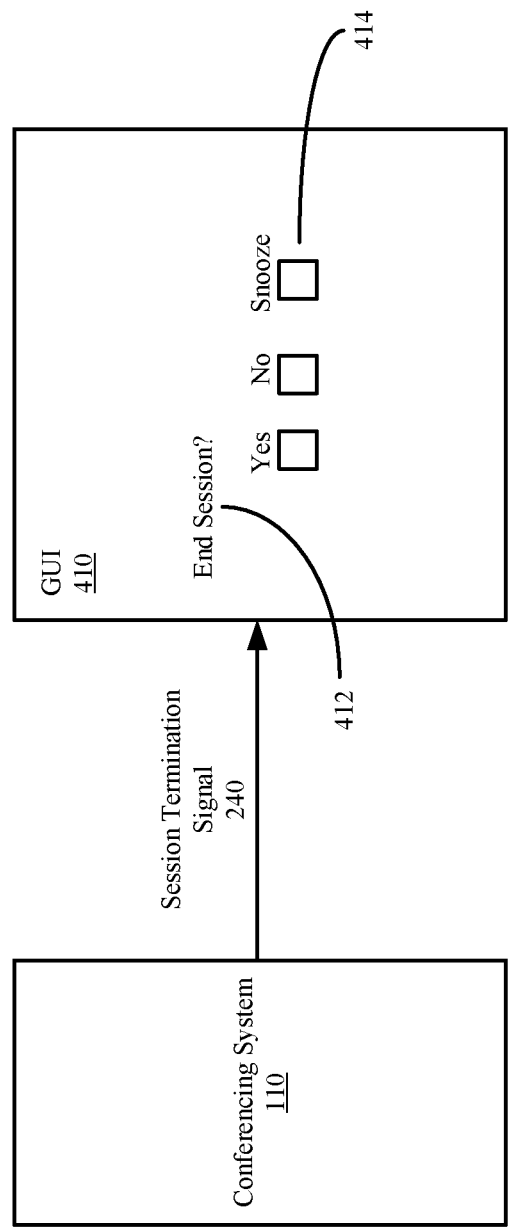
FIG. 4 is a diagram illustrating an example of a GUI rendered to a user in response to determining that the electronic conferencing session has ended or is about to end according to some embodiments.

FIG. 4 is a diagram illustrating an example of a GUI rendered to a user in response to determining that the electronic conferencing session has ended or is about to end, according to some embodiments. The electronic conferencing system 110 may render a message 412 in GUI 410 for each user or a subset of users of the electronic conferencing session, inquiring whether the electronic conferencing session has ended if it determines that the electronic conferencing session has ended or is about to end, as described in FIG. 3C. In some nonlimiting examples, the electronic conferencing system 110 transmits the session termination signal 240 that causes the message, as described, to be rendered by the GUI 410. It is appreciated that the user, e.g., host, may respond by making a selection 414. It is appreciated that in some embodiments, in absence of receiving a response, one or more functionalities of the electronic conferencing session may be suspended or the electronic conferencing session may be automatically terminated.

FIG. 5A is a diagram illustrating an electronic conferencing system generating a recording of an electronic conferencing session and storage thereof, according to some embodiments. It is appreciated that in some embodiments, the electronic conferencing session may be recorded by the electronic conferencing system 110 as recorded content 532 and stored in a memory 520. In some nonlimiting examples, the recorded content 532 may be the content up to a certain point in time at which it is determined that the electronic conferencing session has ended or is about to end, as described above. In other words, despite the lack of user intervention (e.g., a host pressing "end meeting"), the recording of the meeting may stop, thereby utilizing memory more intelligently. Furthermore, as described above, despite the lack of user intervention, the recording of the meeting may stop, thereby reducing any preprocessing or post processing of the content, thereby utilizing processing resources more efficiently and not wastefully.

Figure 5B:
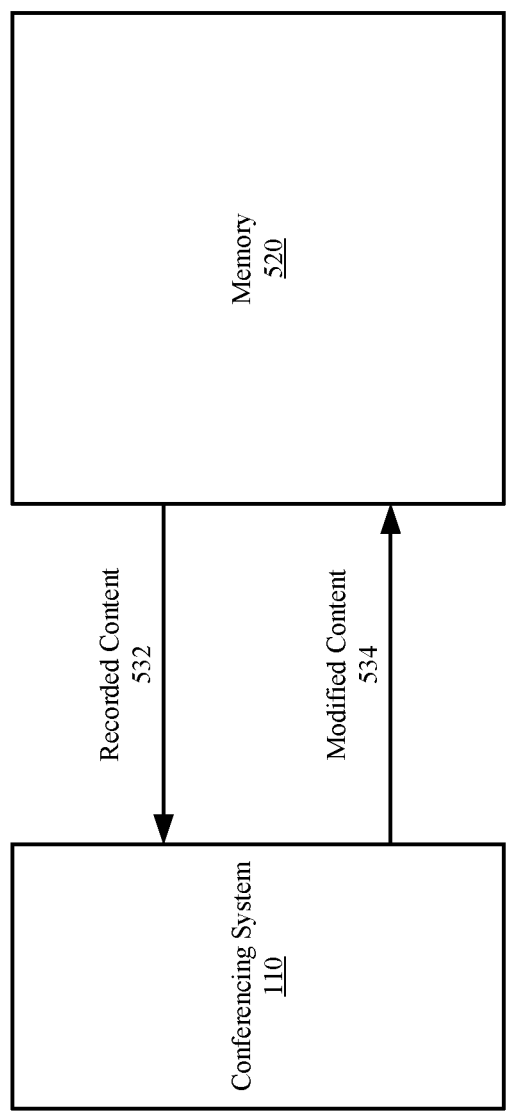
FIG. 5B is a diagram illustrating an electronic conferencing system retrieving a previously recorded electronic conferencing session and modifying the electronic conferencing session in response to determining that the previously recorded electronic conferencing session extends beyond the time that the electronic conferencing session has effectively ended according to some embodiments.

In some nonlimiting examples, the recorded content 532 may be content that includes portions extending beyond the point at which the electronic conferencing session has ended, thereby it may include potentially confidential information and/or embarrassing and/or offensive content, as described above. It is appreciated that the determination of whether an electronic conferencing session has ended or is about to end, as described above, can be applied retroactively. For example, FIG. 5B is a diagram illustrating an electronic conferencing system retrieving recorded content 532 for a previously recorded electronic conferencing session, modifying the recording of the electronic conferencing session in response to determining that the previously recorded electronic conferencing session extends beyond the time at which the session has effectively ended, and storing the modified content 534 back to memory 520, according to some embodiments. The recorded content 532 that was previously stored in the memory 520 may be retrieved by the electronic conferencing system 110. It is appreciated that the memory 520 and the electronic conferencing system 110 may be integrated within a same unit or may be separate from one another. The electronic conferencing system 110 may analyze the recorded content 532, similar to the analysis as described in FIGS. 1A-4, to determine whether the recorded content 532 extends beyond a point of which the electronic conferencing session has ended. In response to determining that the recorded content 532 extends beyond the end of the electronic conferencing session, the electronic conferencing system 110 may modify the recorded content 532. In some nonlimiting examples, the portions of the recorded content 532 that extends beyond the end of the electronic conferencing session may be clipped, as such removing any embarrassing moments or confidential information, as described above. In some nonlimiting examples, the recorded content 532 may be further processed, e.g., audio analysis, speech translation, processing for the enhancement of video, etc., and as such, clipping portions of the recorded content 532 extending beyond the end of the electronic conferencing session results in those clipped portions no longer being processed. The modified content 534 (i.e. clipped electronic conferencing session, clipped processed electronic conferencing session, etc.) may be stored in the memory 520. As such, the amount of memory storage and/or processing power usage allocated for the electronic conferencing session is reduced.

Figure 6:
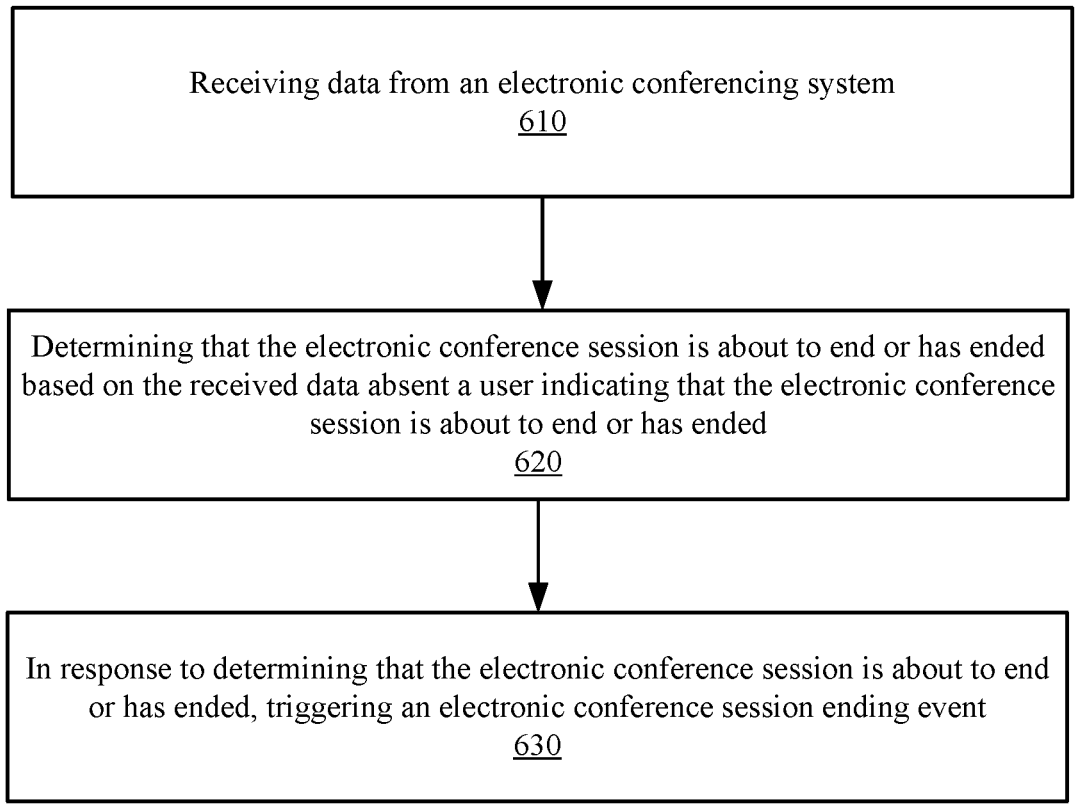
FIG. 6 is a flow chart illustrating an example of method flow for determining whether an electronic conferencing session has ended or is about to end in accordance with some embodiments.

FIG. 6 is a flow chart illustrating an example of method flow for determining whether an electronic conferencing session has ended or is about to end in accordance with some embodiments. At step 610, data from an electronic conferencing system is received, as described in FIGS. 1A-5B. It is appreciated that the electronic conferencing system is configured to facilitate an electronic conference session between a plurality of users. In some embodiments, the received data is data collected during the electronic conference session. At step 620, it is determined that the electronic conference session is about to end or has ended based on the received data, absent a user indicating that the electronic conference session is about to end or has ended, as described in FIGS. 1A-5B. For example, audio data, video data, supplemental data, or any combination thereof may be used to determine whether electronic conferencing session has ended or is about to end, as described above. At step 630 and in response to determining that the electronic conference session is about to end or has ended, an electronic conference session ending event may be triggered, as described in FIGS. 1A-5B. For example, one or more functionalities for the electronic conferencing session may be suspended. In one nonlimiting example, a message may be rendered in a GUI to the user, e.g., host, inquiring whether the electronic conferencing session has ended. In response to the user indicating that the electronic conferencing session has ended, the electronic conferencing system may terminate the electronic conferencing session. In yet some nonlimiting examples, the electronic conferencing session is automatically terminated.

Figure 7:
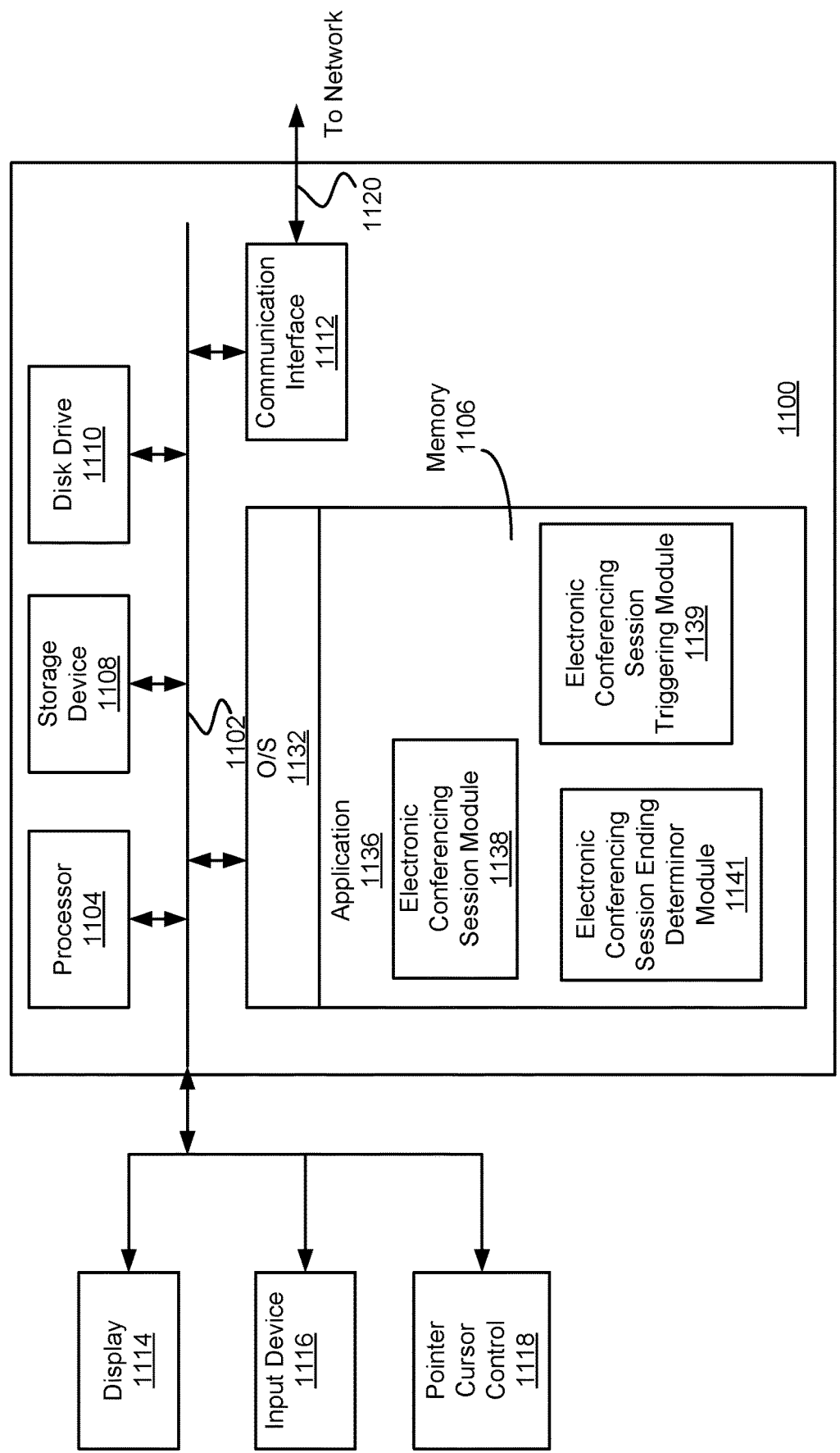
FIG. 7 is a block diagram depicting an example of computer system suitable for determining whether an electronic conferencing session has ended or is about to end in accordance with some embodiments.

Referring now to FIG. 7, an exemplary block diagram of a computer system suitable for determining whether an electronic conferencing session has ended or is about to end in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions for electronic conferencing session module 1138 that facilitates communication, e.g., audio, video, content, etc., between a plurality of users, as well as modules of executable instructions for electronic conferencing session ending determinor module 1141 to automatically determine whether the electronic conferencing session has ended or is about to end and an electronic conferencing session triggering module 1139 that triggers a certain action, e.g., suspend a functionality of the electronic conferencing session, terminating the electronic conferencing session, etc., in response to determining that the electronic conferencing session has ended or is about to end.

The term "computer readable medium" refers, at least in one embodiment, to any medium that participates in providing instructions to processor 1104 for execution. Such a medium can take many forms, including but not limited to, non-volatile media, volatile media, and transmission media.

Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device. Various embodiments can apply to any electronic screen sharing.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
   receiving data from an electronic conferencing system, wherein the electronic conferencing system is configured to facilitate an electronic conference session between a plurality of users, and wherein the received data is data collected during the electronic conference session;
   determining that the electronic conference session is about to end or has ended based on the received data absent an affirmative action by a user to terminate the electronic conference session; and
   in response to determining that the electronic conference session is about to end or has ended, automatically triggering an electronic conference session ending event, wherein the electronic conference session ending event suspends an audio functionality or video functionality of the electronic conference session.

2. The method as described in claim 1, wherein the electronic conference session ending event suspends at least another functionality of the electronic conference session.

3. The method as described in claim 2, wherein the at least one functionality includes suspending a recordation of the electronic conference session.

4. The method as described in claim 1, wherein the electronic conference session ending event renders a message on a graphical user interference to a user of the plurality of users inquiring whether the electronic conference session should be terminated.

5. The method as described in claim 4 further comprising terminating the electronic conference session in response to the user indicating that the electronic conference session should be terminated.

6. The method as described in claim 1, wherein the received data includes audio data collected from the plurality of users during the electronic conference session, and wherein the determining comprises audio analysis to determine whether an audio signature indicative of electronic conference session nearing the end or having ended has been detected.

7. The method as described in claim 6, wherein the audio signature includes a decibel level of the audio data exceeding a threshold level.

8. The method as described in claim 6, wherein the audio signature includes detecting simultaneous conversation between a subset of the users of the plurality of users.

9. The method as described in claim 6, wherein the audio signature includes an audio clue indicative of the electronic conference session ending, wherein the audio clue includes applause by a subset of the users of the plurality of users.

10. The method as described in claim 1, wherein the received data includes video data collected from a subset of users of the plurality of users during the electronic conference session.

11. The method as described in claim 1, wherein the received data includes video data collected from a subset of users of the plurality of users entering/exiting a conference room associated with the electronic conference session.

12. The method as described in claim 1, wherein the electronic conferencing system is a browser-based conferencing system.

13. A method comprising:
monitoring data communication collected from a plurality of users during an electronic conference session between the plurality of users;
determining that the electronic conference session is about to end or has ended based on the monitored data absent an affirmative action by a user to terminate the electronic conference session; and
in response to determining that the electronic conference session is about to end or has ended, automatically triggering an electronic conference session ending event, wherein the electronic conference session ending event suspends an audio functionality or video functionality of the electronic conference session.

14. The method as described in claim 13, wherein the electronic conference session ending event suspends at least another functionality of the electronic conference session.

15. The method as described in claim 13, wherein the electronic conference session ending event includes rendering a message on a graphical user interference to a user of the plurality of users inquiring whether the electronic conference session should be terminated, and wherein the electronic conference session is terminated in response to the user indicating that the electronic conference session should be terminated.

16. The method as described in claim 13, wherein the monitored data includes audio data during the electronic conference session, and wherein the determining comprises audio analysis to determine whether an audio signature indicative of electronic conference session nearing the end or having ended has been detected.

17. The method as described in claim 16, wherein the audio signature includes a decibel level of the audio data exceeding a threshold level.

18. The method as described in claim 16, wherein the audio signature includes detecting simultaneous conversation between a subset of the users of the plurality of users or an applaud by a subset of the users of the plurality of users.

19. The method as described in claim 13, wherein the data includes video data collected from a subset of users of the plurality of users during the electronic conference session.

20. The method as described in claim 13 further comprising receiving an auxiliary data that includes video data collected from a subset of users of the plurality of users entering/exiting a conference room associated with the electronic conference session.

21. The method as described in claim 13, wherein the electronic conference session ending event includes rendering a message on a graphical user interference to a user of the plurality of users inquiring whether the electronic conference session should be terminated, and wherein the electronic conference session remains active in response to the user indicating that the electronic conference session should remain active.

22. The method as described in claim 13, wherein the electronic conferencing system is a browser-based conferencing system.

* * * * *